United States Patent [19]
Kirberg

[11] Patent Number: 5,056,643
[45] Date of Patent: Oct. 15, 1991

[54] METHOD FOR RECORDING THE PLACEMENT OF REPLACEABLE, SELF-FILLING COIN-STORING UNITS

[75] Inventor: Bernd Kirberg, Mönchengladbach, Fed. Rep. of Germany

[73] Assignee: Scheidt & Bachmann Gesellschaft mit beschränkter Haftung, Mönchongladbach, Fed. Rep. of Germany

[21] Appl. No.: 662,331

[22] Filed: Feb. 25, 1991

Related U.S. Application Data

[63] Continuation of Ser. No. 379,474, Jul. 13, 1989, abandoned.

[30] Foreign Application Priority Data

Aug. 25, 1988 [EP] European Pat. Off. ........... 88710022

[51] Int. Cl.5 ........ G06F 15/30
[52] U.S. Cl. ........ 194/202; 235/379; 902/13
[58] Field of Search ........ 194/202, 350; 453/16, 453/17; 364/405; 235/379; 232/7, 15, 16; 902/13; 221/197, 198

[56] References Cited

U.S. PATENT DOCUMENTS 4,650,977 3/1987 Couch ........ 235/381 X
4,670,643 6/1987 Hain et al. ........ 902/13 X
4,808,801 2/1987 Nakagawa ........ 902/13 X

FOREIGN PATENT DOCUMENTS 0164733 12/1985 European Pat. Off. .
2730587 1/1978 Fed. Rep. of Germany .
2651105 5/1978 Fed. Rep. of Germany .
7819192 1/1979 France .
0041457 12/1981 France .

*Primary Examiner*—F. J. Bartuska
*Attorney, Agent, or Firm*—Robert W. Becker & Associates

[57] ABSTRACT

An arrangement including several cashier vending-type machines for goods and services. Each machine, in addition to having at least one cash box, also has not only several replaceable and preferably self-filling coin-storing units for returning or refunding money, but also has a computer that controls the machine, produces a balance, and is provided with a random access memory that is protected against the loss of power. To prevent deceitful manipulations by operators, and to enable a clear determination of error while precluding human error during use, without requiring additional work, each coin-storing unit is provided with an electronic memory that is protected against loss of data and that, upon insertion of that unit into a machine, stores a coding that identifies the machine.

2 Claims, 1 Drawing Sheet

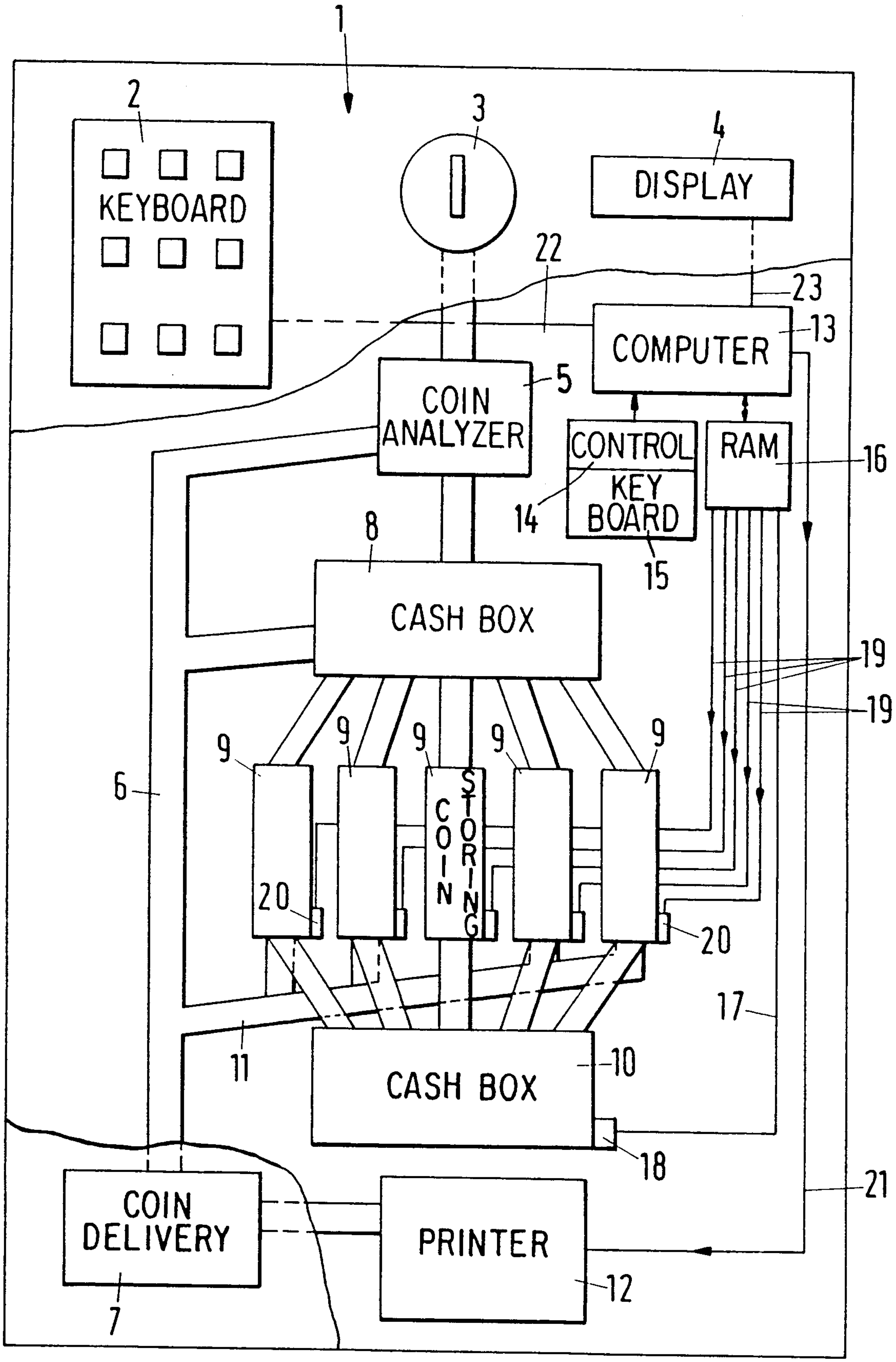
1
2
KEYBOARD
3
4
DISPLAY
22
23
COMPUTER
13
COIN ANALYZER
5
CONTROL
KEY BOARD
14
15
RAM
16
8
CASH BOX
19
19
9
9
9
9
9
6
COIN
STORING
20
20
17
11
CASH BOX
10
18
COIN DELIVERY
7
PRINTER
12
21

METHOD FOR RECORDING THE PLACEMENT OF REPLACEABLE, SELF-FILLING COIN-STORING UNITS

This application is a continuation of application Ser. No. 379,474, filed July 13, 1989, now abandoned.

BACKGROUND OF THE INVENTION

1. Field of the Invention

The present invention relates to an arrangement that includes a number of automatic cashier vending-type machines for goods and/or services, such as machines for issuing travel passes or cards within a certain payment zone, or parking ticket machines of a parking garage company. Each machine, in addition to having at least one cash box, also has not only several replaceable and preferably self-filling coin-storing means for returning or refunding money, but also a computer that controls the machine, produces a balance, and is provided with a random access memory that is protected against the loss of power.

2. Description of the Prior Art

An arrangement of the aforementioned general type is disclosed in German Patent 27 30 587. The machines used for this arrangement are equipped with coin-storing means that each have a differently coded carrier for identification thereof. The code number, which is given one time for each coin-storing means, appears in the balance of the respective machine and in particular in addition to the recognition signal of the respective coin-storing means with regard to its type, for example as a coin-storing means for 5-DM (German Mark) coins.

As a consequence of this coding of all coin-storing means, it is possible upon review of the balance to determine from which machine the coin-storing means originates, so that possible defects of the machine with regard to the storing of certain coins or thefts by operators can be investigated efficiently.

The drawback of the heretofore known arrangement is that for the required association of the coin-storing means with a specific machine of the arrangement, the complete balance must be in hand, either in printed or in machine-readable form. Although additional cross reference lists can be produced that include the insertion of the coded coin-storing means into certain machines, the production of such cross reference lists requires additional work. In both cases, not only are human errors possible during the association, but defective associations can also be manipulated in order to conceal the theft of coins from coin-storing means. Finally, a drawback for the manufacturer of such arrangements is that due to the fixed coding, the coin-storing means cannot be used for different customers or payment zones, so that great care must be taken when such fixed code coin-storing means are returned to the factory for servicing or repair.

It is an object of the present invention, with arrangements of the aforementioned general type, to prevent fraudulent manipulations on the part of operators, and to enable a clear indication of error without making more difficult the replacement of coded coin-storing means during servicing and repair thereof and without requiring the production of cross reference lists. A further object of the present invention is in this connection to preclude human error during use of the balance.

BRIEF DESCRIPTION OF THE DRAWING

These and other objects and advantages of the present invention will appear more clearly from the following specification in conjunction with the accompanying schematic drawing, which shows one exemplary embodiment of a vending-type machine for goods and/or services in the form of a machine for issuing travel passes or cards.

SUMMARY OF THE INVENTION

The arrangement of the present invention is characterized primarily in that each coin-storing means is provided with an electronic memory that is protected against the loss of data and that, upon insertion of that coin-storing means in the machine, stores a coding, for example the number of the machine, that identifies that machine.

Since with the inventive arrangement each replaceable coin-storing means, upon insertion into a respective machine, via appropriate control commands of the computer, is characterized in its electronic memory by the coding of the respective machine, and this characterization is secured in the electronic memory, each coin-storing means can be immediately identified, i.e. without the aid of the balance of the machine or a cross reference list, so that in particular upon a central settling of accounts, an association of the respective coin-storing means with a particular machine is possible without additional measures In this manner, not only can errors of the respective machine during the receipt or issuance of specific types of coins be efficiently determined, but also manipulations can be prevented or associated with particular operators. A limitation of the use of the coin-storing means as a result of a fixed coding that is effected only one time is therefore avoided with the inventive configuration, so that each coin-storing means can be used in any arrangement. The manufacturing number applied to each coin-storing means during production is retained, so that if necessary the date of manufacture and the manufacturing lot to which the coin-storing means belongs can be determined, for example in the case of recalls or warranty work. However, during use of the coin-storing means within the framework of ordinary account settlement, this manufacturing number has no significance. In addition to simplifying the task during investigation of errors and when checking for manipulations, the inventive proposal accordingly provides the advantage that the coin-storing means can be universally used without being limited to a specific arrangement having a limited payment zone.

Pursuant to a further feature of the present invention, in addition to the coding of the respective machine, the date and time of insertion and possibly removal of the coin-storing means into or out of the machine can be stored in the electronic memory of the coin-storing means. This simplifies not only the investigation of errors, but in particular also the determination of manipulations, which due to the additional data, can clearly be associated with particular operators.

Further specific features of the present invention will be described in detail subsequently.

DESCRIPTION OF PREFERRED EMBODIMENTS

Referring now to the drawing in detail, the illustrated vending-type machine 1 for issuing travel passes or cards is part of an arrangement of a number of similar, automatic cashier vending-type machines. The machine 1 is shown with a parallelepipedal housing that in the upper portion, on its front panel, is provided with input keys 2 for the user, a slot 3 for the different types of coins processed by the machine, and a display mechanism 4 for the amount that is to be paid. Disposed within the housing are the components required for processing the coins and for controlling the machine 1. Of these components, shown are those that are central for understanding the manner of operation; the function of these components is described subsequently.

The coins inserted through the slot 3 first pass into a coin-checking mechanism 5 that checks each coin for genuineness. If the coins are counterfeit or defective, or if the coin is one that cannot be processed by the machine 1, it passes via a coin return passage 6 into a delivery means 7 disposed in the bottom left corner of the machine 1. However, if the coin checked by the mechanism 5 is a genuine coin that can be processed by the machine, this coin passes into an intermediate cash box 8 that is provided for retaining the coins in the event that the user interrupts the payment process with the coins that he has inserted into the slot 3. For this purpose, the intermediate cash box 8 communicates via a connector passage with the coin return passage 6.

In the illustrated embodiment, a total of five coin-storing means 9 are provided below the intermediate cash box 8. These coin-storing means 9, for example, can be embodied to receive coins having 0.50, 0.10, 1.00, 2.00, and 5.00 DM (German Marks) denominations. The coin-storing means 9 are preferably self-filling and replaceable storing means that are consequently cyclically removed from the machine 1 and are replaced with new coin-storing means 9.

Disposed below the coin-storing means 9 is a cash box 10 into which the coins inserted by the user pass as soon as the coin-storing means 9 are filled. This cash box 10 is also cyclically removed and replaced with an empty cash box.

By way of example, assume that the user has selected a travel pass having a value of DM 8.40 (German Marks); this amount appears on the display mechanism 4. If, in order to pay for this pass, the user inserts two 5-DM coins one after the other into the slot 3, the genuineness of these coins is checked in the mechanism 5, and if they are genuine, the coins are conveyed into the intermediate cash box 8. From there, the two 5-DM coins pass into the appropriate coin-storing means 9, for example the storing means 9 disposed furthest to the right in the drawing, where they are collected. In the event that this self-filling coin-storing means 9 is completely filled, the coins pass into the cash box 10. The overpaid amount of DM 1.60 is refunded by, for example, the return of a 1-DM coin, a 0.50-DM coin, and a 0.10-DM coin, which are taken from the appropriate coin-storing means 9 and are supplied to the delivery means 7 via a reimbursement or refund passage 11. At the same time, the travel pass selected by the user arrives in this delivery means 7; the travel pass was produced in a printer 12 during the interim.

The control of the previously described procedures is effected by a computer 13 with which a complete control program 14 is associated. This control program 14, to a certain extent, can be influenced by a qualified operator. For example, when service or repair of the machine 1 occurs, it is possible via the control program 14 and the computer 13 to effect production of a balance. Within the framework of this balance production, it is possible, for example, to empty the not completely filled coin-storing means 9 and to replace the empty coin-storing means 9 with completely filled ones. In so doing, required control commands and inputs, for example, can be input via an operator keyboard 15 that is associated with the control program 14.

The data necessary to produce the balance are continuously stored in a random access memory 16 that is associated with the computer 13. From this memory, the balance data, together with the code for the respective machine 1, are conveyed via a data line 17 to an electronic memory 18 that is disposed in the cash box 10, so that when this cash box 10 is replaced, the complete balance is removed with the cash box and can be utilized for settling the account of the respective machine 1.

Via lines 19, the random access memory 16, and hence the computer 13, are connected with electronic memories 20 that are associated with each coin-storing means 9. Just like the electronic memory 18 of the cash box 10, these electronic memories 20 are protected against the loss of data, for example by being connected to a back-up battery. During placement of a respective coin-storing means 9 into a machine 1, a storing of the coding, for example the machine number, that identifies the machine 1, in the electronic memory 20 of each coin-storing means 9 is effected automatically. In this manner, after the coin-storing means 9 has been removed, it can immediately and without difficulty be associated with that machine 1 from which it was last removed. It is thus possible, without difficulty, to associate with an operator errors or possible manipulations that have occurred. In addition to the coding of the respective machine 1, it is also possible to store in the electronic memories 20 of the coin-storing means 9 the date and time of insertion or even removal of the respective coin-storing means 9 into or from the machine 1, thus further simplifying the search for errors and the monitoring of manipulations.

Also shown in the drawing is a control/data line 21 that leads from the computer 13 to the printer 12, as well as control/data lines 22 and 23 between the computer 13 and the input keys 2 or the display mechanism 4. However, it should again be noted that the drawing represents only a rough schematic illustration of the assembly of a vending-type machine 1 for issuing travel passes or cards.

The present invention is, of course, in no way restricted to the specific disclosure of the specification and drawing, but also encompasses any modifications within the scope of the appended claims.

What I claim is:

1. A method for recording the placement of replaceable, self-filling coin-storing means within a number of automatic cashier vending-type machines for goods and services, whereby each one of said machines has at least one cash box, several of said coin-storing means for refunding money, and a computer that controls said machine, produces a balance, and is provided with a random access memory that is protected against loss of power, including the steps of:

encoding each of said automatic cashier vending-type machines with a respective code that identifies each of said automatic cashier vending-type machines;

providing each of said coin-storing means with an electronic memory that is protected against loss of data;

inserting a respective one of said coin-storing means into a first one of said automatic cashier vending-type machines and storing said respective code in said memory of said respective coin-storing means;

removing said respective coin-storing means from said first automatic cashier vending-type machine after use;

inserting said respective coin-storing means into further ones of said automatic cashier vending-type machines, storing said respective code in said memory of said respective coin-storing means, and removing said respective coin-storing means from said further automatic cashier vending-type machine after use;

reading said respective codes stored in said electronic memory of said respective coin-storing means after a completed working cycle to facilitate searching for balance of account errors.

2. A method according to claim 1, further comprising the step of storing in said electronic memory of said coin-storing means the date and time of insertion into and removal of said coin-storing means from said machine.

* * * * *